United States Patent [19]

Al-Khouly

[11] Patent Number: 4,651,437
[45] Date of Patent: Mar. 24, 1987

[54] APPARATUS FOR CHECKING THE INTERNAL DIAMETER OF PIPELINES

[76] Inventor: Jaser O. Al-Khouly, Al-Hani Construction & Trading Bureau, P.O. Box 3062, Safat, Kuwait

[21] Appl. No.: 830,985

[22] Filed: Feb. 19, 1986

[51] Int. Cl.$^4$ .............................................. G01B 7/28
[52] U.S. Cl. .................................. 33/544; 33/147 K; 33/178 F
[58] Field of Search ............... 33/551, 544, 147 K, 33/542, 543, 178 F; 346/33 P, 33 WL

[56] References Cited

U.S. PATENT DOCUMENTS 2,102,080 12/1937 Kinley ............................. 33/544 X
2,980,854 4/1961 Dean et al. ...................... 346/33 P X
3,718,978 3/1973 Van Koeverin et al. ............. 33/544
3,755,908 9/1973 Ver Nooy ......................... 33/178 F Primary Examiner—William D. Martin, Jr.
Attorney, Agent, or Firm—Richard C. Litman

[57] ABSTRACT

Mounted on a carriage movable through a pipeline is a shaft which carries a wheel held against the inner surface of the pipeline. The shaft is arranged so that it can reciprocate transversely of the pipeline as the diameter of the latter varies, and a pen mounted on the shaft marks a line on a recording sheet which is secured to a drum mounted on the carriage and arranged to rotate as the latter travels through the pipeline.

6 Claims, 5 Drawing Figures

APPARATUS FOR CHECKING THE INTERNAL DIAMETER OF PIPELINES

FIELD OF THE INVENTION

The invention disclosed herein relates to an apparatus for inspecting pipelines and more particularly it relates to a mobile machine which records the diameter of a pipeline along its length while traveling through the pipeline.

BACKGROUND OF THE INVENTION

Large plastic pipes are now widely used underground in drainage systems and other fluid flow applications. Such pipe can be damaged if its wall is deflected more than about 5% of the original diameter of the pipe, making the pipe thereafter unsuitable for use. Hence it is important to known whether a plastic pipe has been deformed after its installation in a ditch, as a result of improper backfilling of the ditch or by passage of heavy equipment thereover or otherwise.

BRIEF SUMMARY OF THE PREFERRED EMBODIMENT OF THE INVENTION

A preferred embodiment of the invention comprises: a wheeled carriage sized so that it can pass through a pipeline that is to be inspected for changes in its diameter along its length; a drum rotatably mounted on the carriage; a gear train connected between the drum and wheels of the carriage so that the drum is rotated as the carriage travels through the pipeline; a tubular housing mounted on the carriage so that its longitudinal axis is perpendicular to the longitudinal axis of the pipeline as the carriage moves therealong, the housing having a pair of slots formed in its wall at opposed points thereon and intermediate the ends thereof; a shaft slidably mounted within the aforesaid housing and having a free end which projects from the upper end of the housing toward the inside surface of the pipeline; a wheel mounted on the free end of said shaft; a spring positioned within the housing for resiliently urging the shaft and the wheel thereon toward the inside surface of the pipeline; scribe means mounted on the aforesaid shaft and extending through the slots in said housing and including a pen for marking a line on a recording sheet secured to the side of said drum as the drum rotates; a cable attached at one end to the carriage; and means attached to the other end of the cable for drawing the cable and attached carriage through the pipeline.

DETAILED DESCRIPTION OF THE PREFERRED EMBODIMENT OF THE INVENTION

Figure 1:
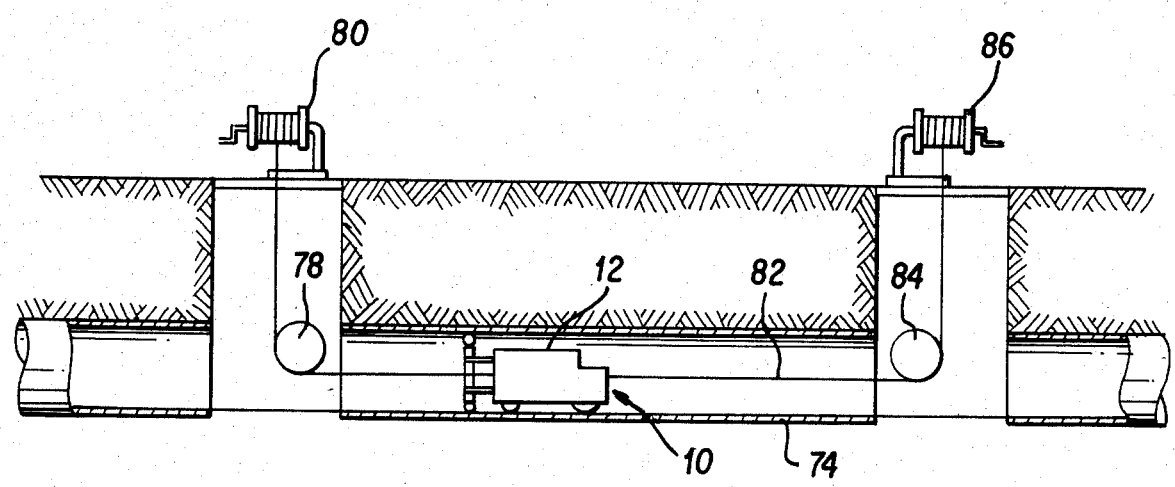
FIG. 1 is a schematic representation of the preferred embodiment of the invention, the view illustrating the apparatus in use within a pipeline.
Figure 2:
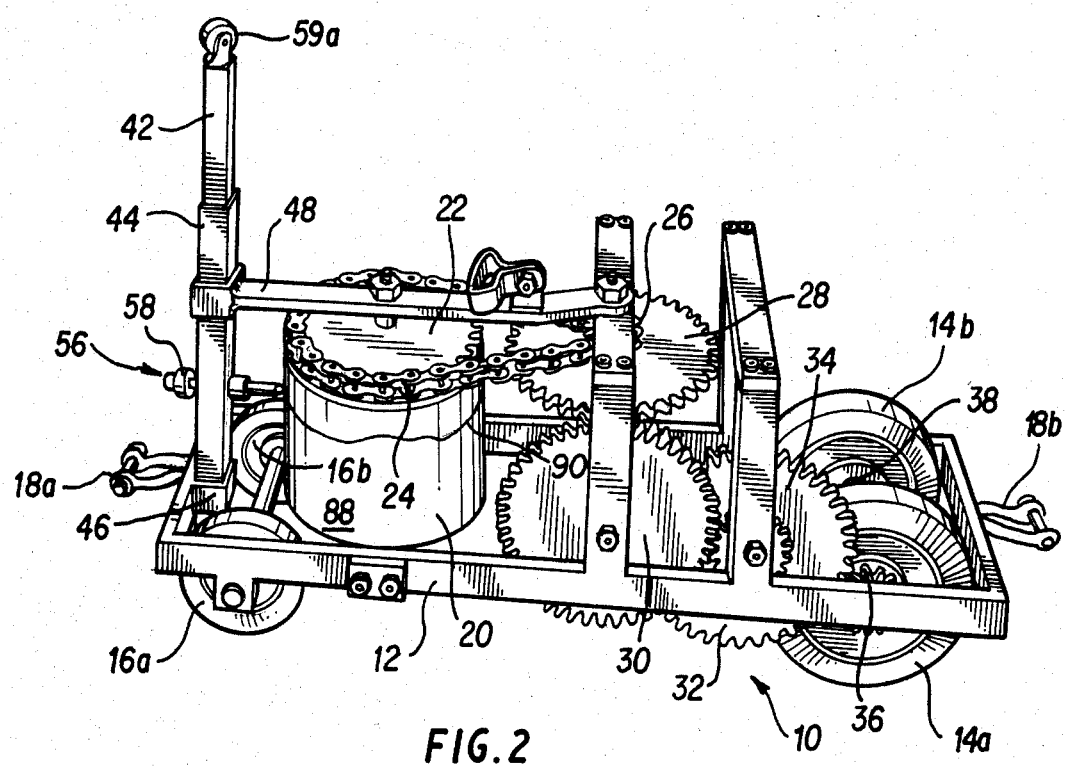
FIG. 2 is a perspective view of components of the preferred form of the invention.

In FIG. 1, reference number 10 generally designates a wheeled carriage provided with a removable cover frame 12, the latter being omitted in FIG. 2 so that components located therein can be seen. Carriage 10 comprises a rectangular frame 12 having a pair of smaller wheels 14a, 14b at one end, a second pair of smaller wheels 16a, 16b at its other end, and a pair of clevises 18a, 18b respectively welded to its ends. Mounted on carriage 10 for rotation about a vertical axis and located adjacent wheels 16a, 16b is a drum 20 which has a sprocket wheel 22 fixed to its upper end. A chain belt 24 connects the aforesaid sprocket wheel with a second sprocket wheel 26, the latter being fixed to a horizontally disposed gear 28 the teeth of which engage the teeth of a vertically disposed gear 30. Gear 30 in turn engages a smaller gear 32 fixed to another large gear 34, and the last-mentioned gear engages a small gear 36 mounted on the axle 38 to which wheels 14a, 14b are secured.

Figure 3:
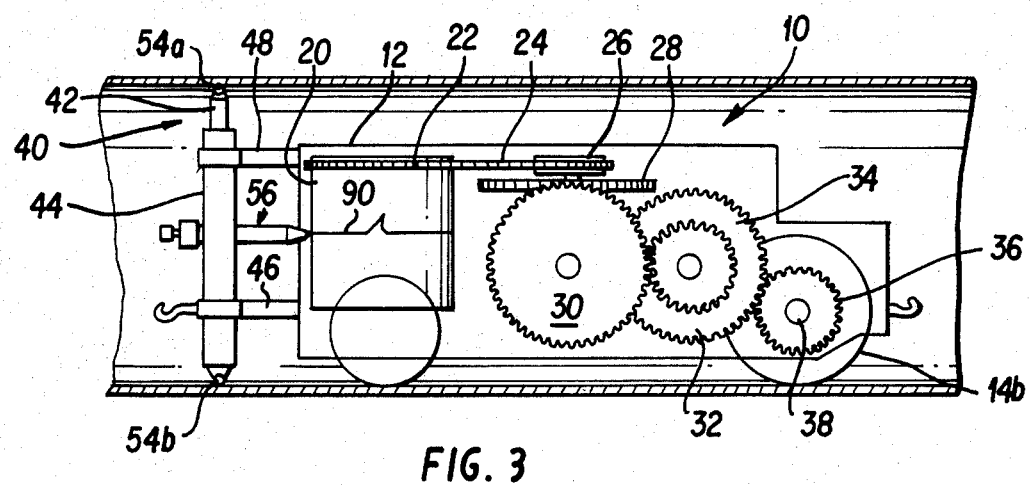
FIG. 3 is a schematic representation of the preferred embodiment, the view showing a gear train used to rotate the recording drum thereof.
Figures 4, 5:
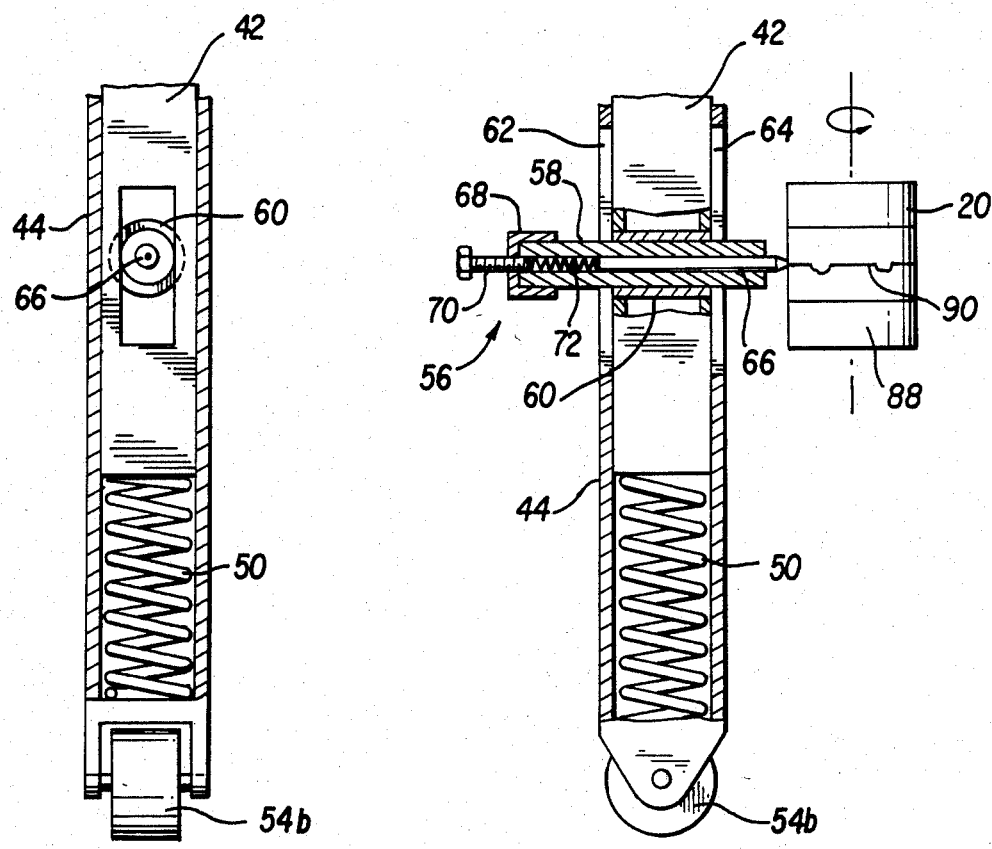
FIGS. 4 and 5 are detail views of components of the preferred embodiment, certain parts being illustrated in section in these drawings so that other components held therein can be seen.

In FIG. 3, reference number 40 generally designates a sensing means comprising a shaft 42 slidably fitted into a tubular housing 44 which is held perpendicular to frame 12 of carriage 10 by two support members 46, 48, the sensing means 40 also comprising a wheel 54a mounted on the end of shaft 42 that projects upward from housing 44. As can be seen in FIGS. 4 and 5 (wherein housing 44 is shown in section), a helical spring 50 is positioned within housing 44 between its closed lower end and the lower end of shaft 42. A wheel 54b is mounted on the lower end of housing 44, the axis of rotation of this wheel, like that of wheel 54a, being perpendicular to the sides of carriage 10.

In FIGS. 2, 3 and 5, reference number 56 generally designates a scribe means comprising a tubular demountable threaded casing 58 which is positioned in a bearing 60 which is fixed in an aperture in shaft 42 and the ends of which respectively pass through slots 62, 64 formed in the wall of housing 44 at opposed points thereon and located intermediate the ends of said housing. As illustrated in FIG. 5, a pen 66 is slidably mounted within casing 58 with its marking end projecting toward drum 20, a collar 68 is attached to the end of casing 58 remote from drum 20, a screw 70 is threadedly engaged in an aperture centered in the end wall of collar 68, and a helical spring 72 is disposed within casing 58 between pen 66 and screw 70.

USE OF THE PREFERRED EMBODIMENT OF THE INVENTION

As illustrated in FIG. 1, carriage 10 can conveniently be moved within a pipeline 74 by a system comprising a first front cable 82 one end of which is connected to clevis 18b on carriage 10, said cable extending horizontally through pipeline 74 to a pulley 84 and thence upward to a winding reel 86, and a second rear cable 76 one end of which is connected to clevis 18a on carriage 10, said cable 76 extending horizontally through pipeline 74 to a pulley 78 and thence upward to a winding reel 80.

It will be recognized from the foregoing description of the preferred embodiment of the invention that as carriage 10 is moved through pipeline 74, rotation of wheels 14a, 14b results in rotation of drum 20 because of the arrangement of the gear train and chain belt 24 which interconnects the drum and the aforesaid wheels. The rate of rotation of drum 20 can readily be pre-determined by proper selection of the sizes of wheels 14a, 14b and the gears connected therewith.

As carriage 10 moves through pipeline 74, wheel 54a is maintained in contact with the inner surface of pipeline 74 by the force exerted against shaft 42 by spring 50. However, shaft 42 is permitted to reciprocate upward or downward in housing 44 if the inside diameter of pipeline 74 varies along the length of the pipeline. Spring 72 maintains pen 66 in contact with a recording sheet 88 recured to the side of drum. Thus since pen 66 is supported on shaft 42, as the shaft reciprocates within housing 44 the pen marks a line 90 (see FIG. 3) on sheet 88 which records any variation in the diameter of pipeline 74 along its length.

It will be recognized that the length of shaft 42 can conveniently be varied so as to enable the apparatus to inspect pipe of different diameters. It will also be realized that various changes can be made in the apparatus which has been described without departing from the concept of the invention. For example, carriage 10 can be provided with a motor for moving it through a pipeline. Rear wheels 16a, 16b can be only one wheel to be travelling at invert of pipeline, in this case wheel 54b fixed to housing 44 can be cancelled. The scope of the invention should therefore be considered as being limited only by the terms of the claims appended hereto.

I claim:

1. Apparatus for inspecting a pipeline comprising: a support movable inside said pipeline along the length thereof; a drum rotatably mounted on said support; drive means on said support for rotating said drum in direct response to movement of said support along the length of the pipeline as said support moves lengthwise of said pipeline; sensing means carried by said support and arranged to (1) remain in contact with the inside surface of the inside surface of said pipeline as said support moves lengthwise thereof, and (2) reciprocate in a direction perpindicular to the longitudinal axis of said pipeline as the diameter of said pipeline varies; and scribe means secured to said sensing means and arranged to mark a line on a recording sheet held on the side of said as said drum rotates in response to said movement of said drive means and as said sensing means reciprocates.

2. Apparatus as defined in claim 1 wherein: said support comprises a wheeled carriage; and said drive means for rotating said drum comprises a gear train connected between said drum and a wheel of said carriage.

3. Apparatus as defined in claim 2 including a tubular housing mounted on said carriage so that its longitudinal axis is substantially aligned with the longitudinal axis of said pipeline and substantially perpendicular thereto as said carriage is moved through said pipeline, said housing having slots formed in its wall at opposed points thereon and intermediate the ends thereof, and wherein said sensing means comprises (1) a shaft slidably mounted in said housing and having a free end which projects upward from said housing toward the inside surface of said pipeline, said scribe means being mounted on said shaft and extending through said slots in said housing, (2) a wheel mounted on the free end of said shaft for engagement with the inside surface of said pipeline, and (3) a spring disposed within said housing for resiliently urging said shaft and said wheel thereon toward the inside surface of said pipeline.

4. Apparatus as defined in claim 3, wherein said scribe means comprises: a tubular casing mounted on said shaft with its longitudinal axis disposed perpendicular to and intersecting the longitudinal axis of said drum; a pen slidably mounted within said casing and having its scribing end projecting therefrom toward said drum; and a spring disposed within a casing for resiliently biasing said pen toward said drum.

5. Apparatus for inspecting a pipeline comprising: a support movable inside said pipeline along the length thereof; a drum rotatably mounted on said support; means on said support for rotating said drum as said support moves lengthwise of said pipeline; sensing means carried by said support and arranged to (1) remain in contact with the inside surface of the inside surface of said pipeline as said support moves lengthwise thereof, and (2) reciprocate in a direction perpindicular to the longitudinal axis of said pipeline varies; and scribe means secured to said sensing means and arranged to mark a line on a recording sheet held on the side of said as said drum rotates and said sensing means reciprocates; said support comprising a wheeled carriage; said means for rotating said drum comprising a gear train connected between said drum and a wheel of said carriage, a tubular housing mounted on said carriage so that its longitudinal axis is substantially aligned with the longitudinal axis of said pipeline and substantially perpendicular thereto as said carriage is moved through said pipeline, said housing having slots formed in its wall at opposed points thereon and intermediate the ends thereof, and wherein said sensing means comprising (1) a shaft slidably mounted in said housing and having a free end which projects upward from said housing toward the inside surface of said pipeline, said scribe means being mounted on said shaft and extending through said slots in said housing, (2) a wheel mounted on the free end of said shaft for engagement with the inside surface of said pipeline, and (3) a spring disposed within said housing for resiliently urging said shaft and said wheel thereon toward the inside surface of said pipeline.

6. Apparatus as defined in claim 5, wherein said scribe means comprises: a tubular casing mounted on said shaft with its longitudinal axis disposed perpindicular to and intersecting the longitudinal axis of said drum; a pen slidably mounted within said casing and having its scribing end projecting therefrom toward said drum; and a spring disposed within a casing for resiliently biasing said pen toward said drum.

* * * * *